M. JOHNSON.
Hand-Truck.

No. 212,605. Patented Feb. 25, 1879.

UNITED STATES PATENT OFFICE.

MOSES JOHNSON, OF LOCKPORT, NEW YORK, ASSIGNOR OF ONE-HALF HIS RIGHT TO M. C. RICHARDSON, OF SAME PLACE.

IMPROVEMENT IN HAND-TRUCKS.

Specification forming part of Letters Patent No. 212,605, dated February 25, 1879; application filed January 4, 1879.

*To all whom it may concern:*

Be it known that I, MOSES JOHNSON, of Lockport, in the county of Niagara and State of New York, have invented certain new and useful Improvements in Hand-Trucks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
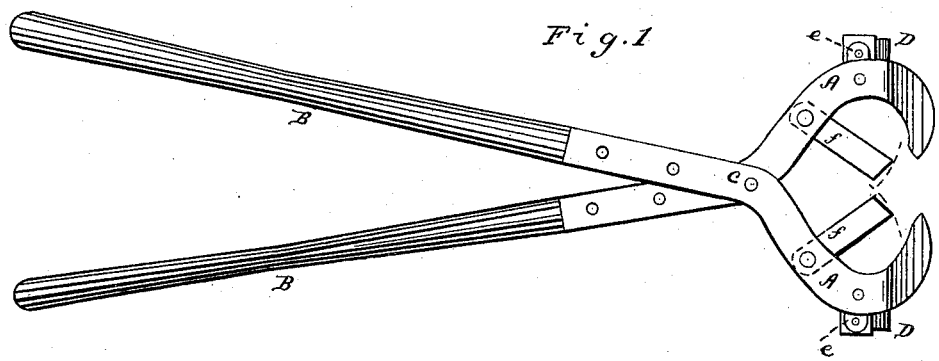
Figure 2:
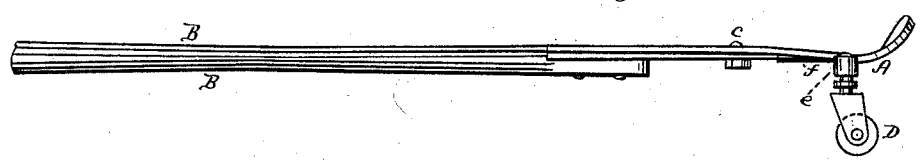
Figure 3:
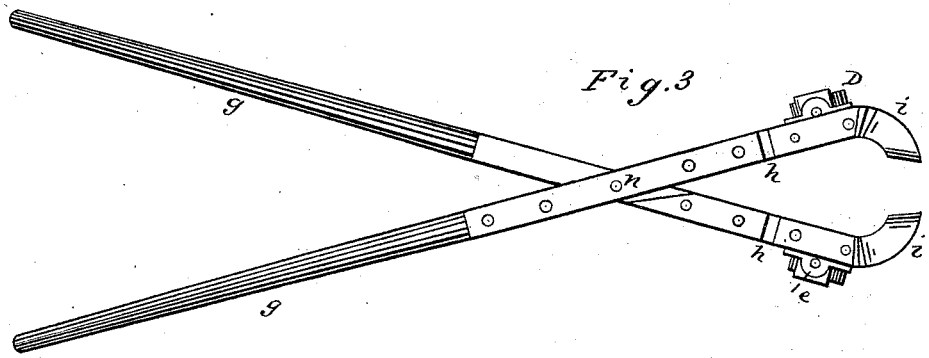

Figure 1 represents a top or plan view of my improved grappling-truck with the jaws thereof partially expanded. Fig. 2 is a side elevation of the same. Fig. 3 is a plan or top view of a modified form.

My improvement consists, first, in a hand-truck having a pair of expansible jaws; secondly, in a hand-truck composed of a pair of expansible jaws provided with suitable handles, and mounted upon one or more caster-wheels; thirdly, in adjustable bearing-pieces connected with expansible jaws in such manner that certain articles, when grappled by the said jaws, may be readily tilted back upon the truck, all substantially as hereinafter more fully set forth and claimed.

In my improved truck the jaws and handles practically constitute two pivoted levers, the shorter ends of which are adapted to constitute the expansible truck-jaws, and the longer ends of the same to subserve the double purpose of handles for opening and closing the jaws, and handles whereby the truck may be propelled in the usual way.

Referring by letter to the drawings, Figures 1 and 2 illustrate one form of my improved truck, in which the two pivoted levers are composed, essentially, of the expansible jaws A A and handles B B, pivoted together at $c$ by a bolt or pin. As herein shown, the jaws are curved and the handles straight, although, if it is desired, a curvature may be also given to the handles. In this device I propose making the jaws of metal and the handles of wood, the two being connected by bolts, rivets, or any other suitable means.

The pivotal point $c$ should be nearer to the jaws than to the handle ends of the levers, whereby the requisite leverage will be obtained.

D D represent the caster-wheels, which are swiveled in the brackets $e$ $e$, and which I prefer to secure upon the sides of the expansible jaws, substantially as shown, so that they will be out of the way, and not interfere with the grappling of various articles which are to be raised and transported. These wheels should turn freely, so as to readily conform to the line of draft.

The ends of the expansible jaws have, in addition to the general curvature or semicircular form shown in Fig. 1, an additional upward curvature, illustrated more clearly in Fig. 2, whereby the device may be used in the same way as an ordinary hand-truck when the jaws are closed, or as a truck for grappling and raising articles in the following manner, to wit: When such articles as stoves, boxes, or barrels, &c., are to be raised and transported, the jaws are expanded by opening the handles, and the curved jaw ends then wedged under the bottom of the article at the sides thereof by compressing the handles, after which the article may be readily tipped back upon the truck.

As it is desirable, however, to perform this work rapidly and with the labor of but one person, I pivot to the jaws two bearing-pieces, $f$ $f$, which may be swung upon their pivotal points, and thereby adjusted relatively to the requisite expansion of the jaws, so that their ends shall bear against the article under which the jaws are wedged.

In this way, when the handles are depressed, and the jaws consequently elevated, the article to be carried will be tipped back upon the truck.

Filled bags may be either grappled by the jaws, or the jaws may be wedged under the same and the article then tipped back.

Iron, &c., may also be readily picked up and carried by this improved device. If, however, a box wider than the expansive limit of the jaws is to be placed upon the truck, the jaws may be closed and then shoved under the box in the usual way.

In some cases it is desirable to swing the bearing-pieces $f$ $f$ out of the way, as where the jaws are intended to partially or entirely encircle the article to be raised.

The ends of the jaws may also be made sufficiently sharp to penetrate the sides of boxes, and thereby raise them from the ground without wedging them under the article, or they may be made blunt, when the trucks are especially adapted for grappling bags of flour and the like In Fig. 3 the levers are represented as composed of the wooden handles *g g*, with straight jaw ends *h h*, and the metallic jaws *i i*, secured upon the said ends *h h*. In this case the parts *g g* and *h h* of each lever are connected together by means of metallic strips or plates riveted down upon the same. As shown, one lever passes between the plates which connect the two portions of the other, and both are pivoted together by means of a bolt or pin, *n*. It is obvious that this improved truck may be constructed in a variety of forms without departing from the spirit of my invention.

What I claim is—

1. A hand-truck having expansible jaws A A, in connection with lever-handles B B, pivoted at *c*, and adjustable bearings *f f*, and mounted on one or more wheels, substantially as shown and described.

2. The combination and arrangement of jaws A A, with casters D D, adjustable bearings *f f*, and pivoted handles B B, substantially as shown, and for the purpose specified.

3. The adjustable bearings *f f*, connected with the expansible jaws A A, substantially as shown and described.

In testimony that I claim the foregoing as my own I affix my signature in presence of two witnesses.

MOSES JOHNSON.

Witnesses:
J. J. ARNOLD,
JOSEPH ARNOLD.